D. A. Pratt,
Motor.

Nº 69,699. Patented Oct. 8, 1867.

Witnesses
E. B. Barnum
A. B. Laurence

Inventor,
D. A. Pratt

United States Patent Office.

D. A. PRATT, OF TREMONT, NEW YORK.

*Letters Patent No. 69,699, dated October 8, 1867.*

---

IMPROVEMENT IN MOTIVE POWER FOR LOCOMOTION AND OTHER PURPOSES.

---

*The Schedule referred to in these Letters Patent and making part of the same.*

---

TO ALL WHOM IT MAY CONCERN:

Be it known that I, D. A. PRATT, of the village of Tremont, town of West Farms, county of Westchester, and State of New York, have invented a new or improved Motive Power for Locomotive and other Purposes; and I do hereby declare that the following is a full, clear, and exact description thereof, which will enable those skilled in the art to make and use the same, reference being had to the accompanying drawings, forming part of this specification, in which—

Like figures and letters refer to like parts.

Figure 1:
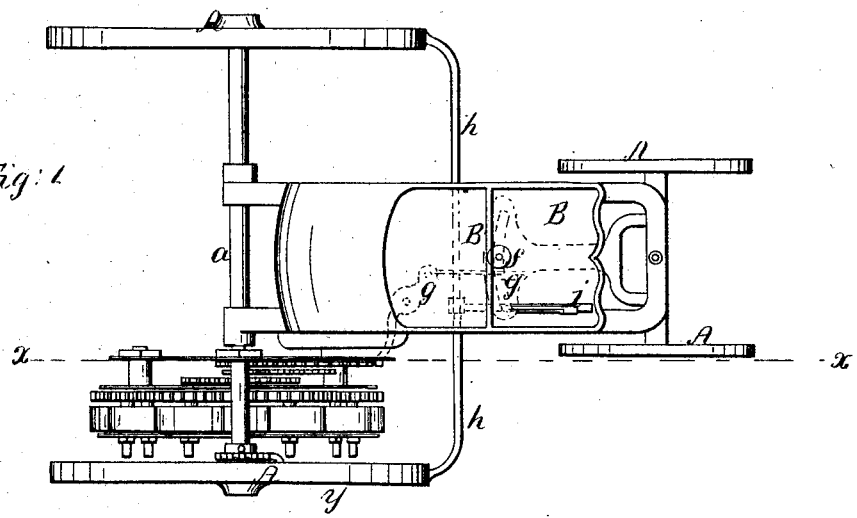
Figure 1 is a top view of the invention, with its connections as applied to a common buggy-wagon in running upon the highway.

The object of this invention is to find some motive power for street and other cars, as well as for common pleasure-carriages and buggies on park, cemetery, and other roads, less expensive and troublesome than horses, and more durable and certain of management, as well as less dangerous and capricious in action; also, something for small manufacturing purposes, especially in cities and places where steam is at once either impossible, or, if possible, a nuisance both dangerous and expensive. Nor do I despair of successfully applying my invention to the common steam railways of the world.

Now, although it is true that my invention does not create any power within or of itself, like the horse or the steam engine, but is rather the receptacle or accumulator of previously-existing power—merely storing it, as it were, like capital in bank ready for future drafts in times of want and emergency—yet it is perfectly practicable by said means to store up a power equal to three to five tons in weight or pressure on a small buggy-wagon, to be distributed over a given distance of, say, about six miles, at what I call the fourth "remove from power," (as will be explained hereafter,) or seventeen miles at the fifth "remove," or forty-five miles at the sixth "remove," while to a common street car I can thus store up from twenty to forty tons, and to a common steam-car, not the engine, but to each and every passenger car, fifty to seventy tons, to be distributed over the road, (in distance according to the "remove" of power used,) as is yet to be explained.

Now, if a light buggy, with its usual load of two persons, can be set in motion on a smooth, hard road by a seven-pound weight attached with cord and pulley, we can approximate to the strength or thickness of the power used when three or four tons are spread over either six, seventeen, or forty-five miles, because, by actual experiment as well as calculation, we find that the third "remove" in this machine (or for two miles) gives us five and a half pounds of actual and constant moving power for every one hundred pounds stored, and for the fifth "remove" (or seventeen miles) eleven ounces for every one hundred pounds stored, and for the sixth "remove" (or forty-five miles) four ounces for every one hundred pounds stored. Thus, if four tons are stored on a buggy we can get four hundred and forty pounds of constant pulling power for two miles, in the place of the seven-pound weight, and for seventeen miles sixty-four pounds, and for forty-five miles twenty pounds; in either case ample power to move a buggy over ordinarily smooth and level roads. It is not necessary to extend this style of remark to horse or steam-car, for the same per cent. of the power stored, compared to distance, applies equally to them.

But in this connection the answer to the question, Will not the cost of accumulating and storing this power by this invention be as great as by any of the present means of creating it as wanted, becomes vital to the enterprise. I answer, By no means. To prove this answer true, I will illustrate as follows: Take the buggy with its three to five tons of power and to run its forty-five miles. This power consists in the multiplication of the common coiled ribbon steel spring, or main-spring as usually called, or, in lieu thereof, of the spiral coiled wire spring, so constructed and arranged that their numbers, size, and strength may be increased, without limit or disadvantage, up to the extent of filling up all the spare room or space otherwise unoccupied, while the power of each of these springs is economically and advantageously carried by combination to one common centre or point of deliverance or use. For the sake of convenience I call this point the "unit of accumulated power," and from this point I also start what I call the first, second, third, fourth, and, if you please, up to the tenth "remove of power." Of course, the first "remove" consists in applying this "unit of power" directly to a pinion, $a$, fig. 3, whose gear-wheel $a$ carries a diminished portion of the power thereof to the pinion $b$ (same figure) of the second "remove," whose gear $b$ again in turn carries a further diminished portion of the power to the third "remove," or $c$ pinion, (same figure,) and so on $ad$ $infinitum$ to the last point of practicability. It will be seen that each "remove" increases the distance travelled at the expense of and just in proportion to the diminution of power, precisely on the principle of the weight and pulley.

To the question of the cost of this, say five tons of power on the buggy, I observe, it is accumulated or stored by man and crank on the ratchet-shaft, where the springs are small in size and few in number on the same shaft, and by stationary steam or other power on a pinion and gear, by a little new arrangement of machinery, not necessary to describe here, which winds up all the springs or shafts at the same time, or by one operation, where the springs are large and powerful, and several of them on the same shaft. Now, suppose I use fifty springs, (it would be practicable in this invention to use more and stronger or less and weaker ones,) each of which will wind one hundred pounds or so on its barrel of six or eight inches in diameter, and put two or three of these springs on each gear and ratchet-shaft, with a man at a fifteen-inch crank to make fifteen or twenty turns, and thereby store away two hundred or three hundred pounds of power; he will use his "force" for about thirty seconds on each shaft, and the whole time consumed in winding up all the shafts or springs will be from ten to fifteen minutes. Thus the expense of my day's journey of forty-five miles is, say, fifteen minutes of the gardener's time at two dollars per day, while the time and expense of the hostler and driver are dispensed with for the whole day. The cost, therefore, of one power is five cents per day for forty-five miles of motive power, against about three dollars (man and team) of the other, or one in sixty. Is the question answered?

Figure 2:
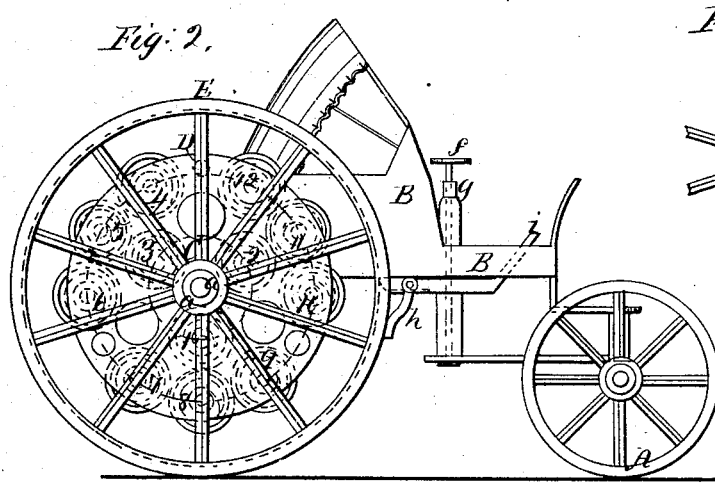
Figure 2 is a side elevation, with the same connections applied to the same vehicle, and with like results, and showing the motive powers and their gear connections.
Figure 3:
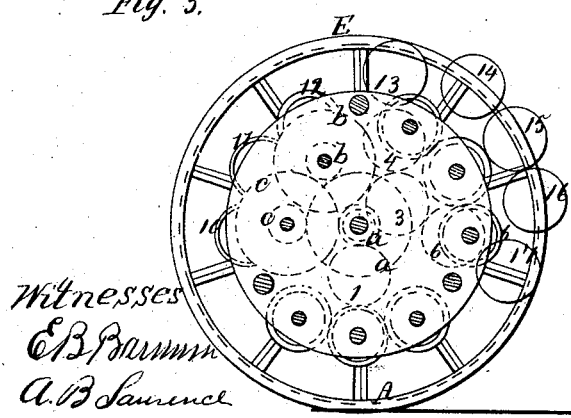
Figure 3 is a sectional view of the invention, showing the motive powers and their gear connections while looking from $x\ x$ to $y$ in fig. 1, and how they may be multiplied almost indefinitely.

To describe my invention a little more minutely I would say, fig. 2 is an elevated view of a common turnpike-buggy, built in the usual style and form; A A are the wheels thereof, B B the body and seat, $a$ the hind axle. Upon this hind axle I put a loose pinion and gear, $a$ $a$, as seen in fig. 3, of any desired diameter and strength. Upon opposite sides of this pinion $a$, and disconnected with each other, I put one, two, three, or four gear-wheels, fig. 2, which play loose upon a ratchet-shaft, and whose ratchet is connected therewith by the usual pawl and spring. Upon this ratchet-shaft or axle is placed one or more coiled or circular ribbon springs, commonly called "main-springs," or in lieu of these a coiled spiral wire spring, of any desired size, length, and strength. These gear-wheels, thus far spoken of, are numbered 1, 2, or 3, fig. 2, and are centred on the first or C-dotted blue-line circle from the pinion $a$ shaft. Thus, in this instance, only three of such gear-wheels are on this first or C circle. Upon the second or D blue-dotted circle from said pinion-shaft I place, in this instance, nine more similar gear-wheels, numbered, as seen in figs. 2 and 3, from 4 to 12 inclusive, and connected with each other in groups of three each, while each group of three is connected by its centre gear to one or the other of Nos. 1, 2, or 3. Each of these nine gear-wheels has the same connections and surroundings of springs, ratchets, &c., as Nos. 1, 2, and 3. This completes the extent of the multiplication of these gear-wheels and springs in these drawings, but the plan contemplates the addition of as many more circles for centres, marked in blue, similar to the first and second or C and D circles here used, upon which to place more and similar gear and springs, as may be necessary to make up the desired power or reach the desired length of time or distance. Each additional circle of gear and springs being larger in diameter than its predecessor it will, in each case, hold as many, or even more, in numbers of said gear and springs, as are on all the said circles combined which precede it, that is, a third or E circle will hold fifteen of said gear and spring-shafts, while both C and D combined will hold only twelve. An F circle added would hold thirty, while C D and E united only hold twenty-seven. Of course each circle of power added should not send its increased accumulation of power to the common centre through one channel in each group, and much less through one channel without reference to the three groups. This may be avoided in my plan by dropping the centres of Nos. 4 and 6 in group three, fig. 2, and Nos. 7 and 9 in group one, same figure, and Nos. 10 and 12 in group two, same figure, towards the shaft $a$ or pinion centre, so as to disconnect them from Nos. 5, 8, and 11, as now seen in fig. 2, to the small blue circles numbered 4 and 6, as seen in fig. 3, whereby they will connect directly with Nos. 1, 2, and 3, by two new channels in each group, one on each side of Nos. 5, 8, and 11; while if the third or circle E be added, a fair portion of its power in each group may thus reach the common centre, or "unit of power," through Nos. 4 and 6, 7 and 9, and 10 and 12, by merely dropping Nos. 13 and 17 from their natural circles, so as to connect with 4 and 6, as seen by the small blue circles in fig. 3, and so on, if the fourth or F circle is added.

Since it is found hitherto partly impracticable, in manufacturing these ribbon-springs, to increase their thickness and width beyond a certain point, on account of uneven tempering and otherwise, I find it practicable in my invention to use several of them on the same shaft, working into one ratchet and gear-wheel, thus obtaining, in connection with the idea of multiplying these shafts indefinitely with their respective ratchets, gear, &c., working into each other, and all tending to or concentrating in one common point or "unit of power," any amount of power desired, while it enables me at the same time to prolong the life of my power far beyond anything heretofore known, and sufficiently to make it decidedly available for nearly all practicable motive purposes, especially those of the lighter kind, and not of too prolonged continuance.

But in order still further to prolong the life of my power for increased distances in locomotion, and to have double strength available for starting purposes and up-grades, I place upon the left-hand side of the vehicle a duplicate set of power and gear, the same as here represented, only on the right side of the buggy; this duplicate set of power to be held dormant and in reserve by some simple catch or brake, as seen at $g\ g$, figs. 1 and 2, until the first is exhausted, except when its assistance is temporarily needed, as explained, when it too can be used.

Figure 5:
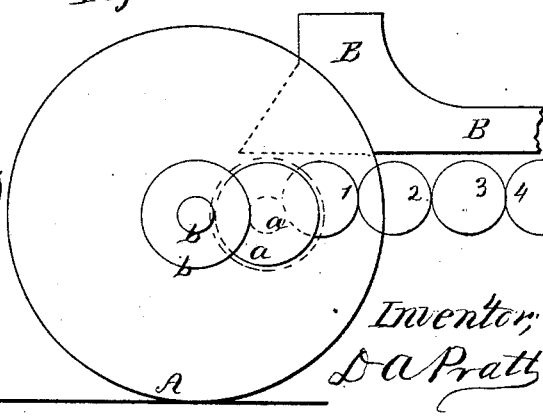
Figure 5 is a modification of my invention, showing the different powers placed in a straight line from the "unit of power," instead of in a circle around that unit of power as a common centre.

It is not essential to the application of my invention that the gear, with their ratchet-shafts and connections, should be placed around a common centre in a circle, as in this drawing, for they may be placed in a straight line from the unit or units of centre or of power, as seen in fig. 5, or in any other direction or manner most convenient or serviceable, as, for instance, under a car or buggy body, when great power and long distance are required. Thus, two or more of straight lines of gear, such as are numbered 1, 2, 3, and 4, and seen in fig. 5, one above the other, may be used, and made to work into two or more separate "units of power," one on each end of the car, or from the ends and centre of the car, each way, to a one-fourth or three-fourth point in the car, or in any other way.

The duplicate or left-hand power, as described above in the case of the present circular or buggy application, is also contemplated in this, (fig. 5,) style of application, and for the same and other reasons. Indeed, I do not hold myself to the circular form of application in any vehicle, not even in the buggy, nor to any other particular or specified form, but I could here "model" it but one way.

In place of teeth on gear-wheels Nos. 1, 2, 3, 4, &c., I also claim the use of endless linked chains on toothed pulleys, if convenient or necessary, or such chains and gear combined.

In case spiral wire springs are used I make them of any desired size, length, and strength. But in order to multiply strength, and consequent length of life, I must, in some cases, as with the coiled or ribbon spring, desire to place two or more of these springs upon the same shaft, though this, be it distinctly understood, is not absolutely essential to my invention, whichever style of spring I may use, except where such is more convenient. In order to make this practicable, when desired, I make them in "sets" of one, two, or more in "the set," and of various diameters, the smallest size working inside the next in size, while each size in diameter is encased within a thin metal drum which acts as a shaft or sleeve to the next one in size in the same set. When "wound up" these wire springs, like the coiled ones, become considerably smaller in diameter, consequently there should be considerable room, when unwound, between each spring and the metal drum within it. The wire springs should be "cone-shaped," as well as spiral, for most purposes, but may be either cone in shape, or of the usual style, as the result wanted may call for.

Of course I disclaim the use of the coiled ribbon spring as a power, it having been used in many ways as a power for various purposes for centuries, even perhaps for locomotion, for aught I know. But I am not aware that it has ever been made practically available for locomotive or general manufacturing purposes, or anything else, except for time, music, toys, and the like.

Figure 4:
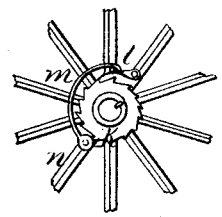
Figure 4 is a sectional view of the connections of this motive power to the rear right-hand wheel of a buggy as used in locomotion, showing how the buggy may move (down an incline, for instance,) while the motive power remains still or dormant.

In order to prevent a waste of power when descending a grade, or when wanting to "brake up," it is necessary that the driving or ground-wheels should be allowed a forward rotary motion independent of the proper motive power connections. To do this I apply the power to the driving-wheel by means of a ratchet-wheel made fast upon the driving-shaft $a$, with the pawl on the wheel, as seen in fig. 4, instead of crank and pin, or other device, thus allowing the husbanding of power when not wanted, and at the same time obtain a continued forward motion of the car or carriage down the incline, and thus, also, allowing the outer wheel to make the greater distance in turning a curve.

As to guiding the carriage on common roads, braking up, or of starting and stopping the power, the drawings will sufficiently explain themselves. I now do it by any of the ordinary means, a common brake or catch, $f\ g\ i$, figs. 2 and 3.

Having thus described my invention, what I claim as new and useful, and desire to secure by Letters Patent, is—

1. The mode and manner of adding the power of one "coiled, ribbon, or main-spring," or, in lieu thereof, a "coiled spiral wire spring," to another, by gear, or its equivalent, in such a manner that the power of each and all of them shall reach one or more common centres or "units of power," substantially as described.

2. The use of spiral wire springs in "sets," as well as also a coiled ribbon or main-spring in groups, as herein described for motive purposes.

3. The mode and manner of attaching this particular power, as herein set forth, to the driving-wheels of the carriage thereof, for the purposes and as described.

4. The combination of this power, when thus accumulated, with three or more pinions and gears, as described and for the purposes set forth.

D. A. PRATT.

Witnesses:
  E. B. BARNUM,
  A. B. LAURENCE.